(12) United States Patent
Agarwal et al.

(10) Patent No.: US 11,157,167 B2
(45) Date of Patent: Oct. 26, 2021

(54) SYSTEMS AND METHODS FOR OPERATING A MOBILE APPLICATION USING A COMMUNICATION TOOL

(71) Applicant: PAG Financial International LLC, Guaynabo, PR (US)

(72) Inventors: Pavan Agarwal, Arcadia, CA (US); Gabriel Albors Sanchez, Arcadia, CA (US); Jonathan Ortiz Rivera, Arcadia, CA (US)

(73) Assignee: PAG Financial International LLC, Guaynabo, PR (US)

( * ) Notice: Subject to any disclaimer, the term of this patent is extended or adjusted under 35 U.S.C. 154(b) by 0 days.

(21) Appl. No.: 16/867,458

(22) Filed: May 5, 2020

(65) Prior Publication Data

US 2021/0072890 A1    Mar. 11, 2021

Related U.S. Application Data

(63) Continuation-in-part of application No. 16/565,452, filed on Sep. 9, 2019, now Pat. No. 10,992,605.

(51) Int. Cl.
*G06F 3/01* (2006.01)
*G06F 3/0488* (2013.01)

(52) U.S. Cl.
CPC .......... *G06F 3/04883* (2013.01); *G06F 3/011* (2013.01); *G06F 3/016* (2013.01); *G06F 3/017* (2013.01); *G06F 3/0488* (2013.01)

(58) Field of Classification Search
CPC ........ G06F 3/16; G06F 3/017; G06F 3/04883; G06F 3/0488; G06F 2203/0381; G06F 21/32; G06F 3/041; G06F 3/04847
See application file for complete search history.

(56) References Cited

U.S. PATENT DOCUMENTS

| | | | |
|---|---|---|---|
| 9,585,189 B1 * | 2/2017 | Rastas | .............. H04W 76/20 |
| 10,356,243 B2 | 7/2019 | Sanghavi | |
| 10,496,705 B1 | 12/2019 | Irani | |
| 10,684,703 B2 | 6/2020 | Hindi | |
| 10,686,738 B2 | 6/2020 | Daniel | |

(Continued)

*Primary Examiner* — Chirag R Patel
(74) *Attorney, Agent, or Firm* — Sheppard Mullin Richter & Hampton LLP

(57) ABSTRACT

Systems and methods are provided for using non-standard haptic commands to control and operate applications or websites. A computer-implemented method may include use non-standard haptic commands to initiate a conversation interface for operating a mobile application. For example, the method may display the conversation interface adjacent to the GUI of the mobile application in response to obtaining a command for initiating a conversation interface. Next, the method may determine a user input area of the mobile application associated with a touchscreen location of the haptic input and obtain information specifying user input received by the user input area of the mobile application. Further, the method may determine a potential user action based the user input received by the user input area of the mobile application, display a first suggestion based on the potential user action the conversation interface, and update the mobile application based on the first suggestion.

18 Claims, 5 Drawing Sheets

(56) References Cited

U.S. PATENT DOCUMENTS

| | | | |
|---|---|---|---|
| 2011/0251954 A1* | 10/2011 | Chin | G06F 3/04883 |
| | | | 705/40 |
| 2016/0098988 A1 | 4/2016 | Goussard | |
| 2016/0234244 A1 | 8/2016 | Mehta | |
| 2016/0360382 A1* | 12/2016 | Gross | G06F 9/445 |
| 2017/0243195 A1* | 8/2017 | Xing | G06K 9/00892 |
| 2017/0272654 A1* | 9/2017 | Poindexter, Jr. | H04N 5/23216 |
| 2017/0295122 A1 | 10/2017 | Pfriem | |
| 2017/0372189 A1 | 12/2017 | Joo | |
| 2019/0188781 A1 | 6/2019 | O'Brien | |
| 2019/0210561 A1 | 7/2019 | Middelanis | |
| 2020/0034399 A1* | 1/2020 | Beno | G06F 16/3329 |

\* cited by examiner

SYSTEMS AND METHODS FOR OPERATING A MOBILE APPLICATION USING A COMMUNICATION TOOL

RELATED APPLICATIONS

This application is a continuation-in-part of U.S. patent application Ser. No. 16/565,452 filed on Sep. 9, 2019, the contents of which are incorporated herein by reference in its entirety.

TECHNICAL FIELD

The present disclosure is generally related to non-standard haptic commands. More particularly, the present disclosure is directed to systems and methods for using non-standard haptic commands used to initiate a conversation interface for operating a mobile application.

BACKGROUND

Computing devices equipped with touchscreen technology allow users to utilize a variety of means to enter, access, and/or manipulate data displayed on or stored in a computer. For interacting with a touchscreen, users commonly use a finger of the hand or a stylus. Depending on the technology, the position of the finger or stylus on the touchscreen is determined by capacitive sensing or resistive sensing. The user can trigger touchscreen events through gestures, e.g., by tapping on the touchscreen with the finger or by dragging the finger over the touchscreen. The touchscreen events cause the system to execute functions, usually accompanied by a change in the content displayed on the touchscreen.

A common user-triggered function includes application initiation, i.e., effectuating presentation of a graphical user interface (GUI) associated with the application. The GUI is a type of user interface that allows users to interact with computing devices using images rather than text commands. That is, a GUI represents the information and actions available to a user through graphical icons and visual indicators such as secondary notation, as opposed to text-based interfaces, typed command labels or text navigation. When using the GUI, the actions are usually performed through direct manipulation of the graphical elements.

While GUI interfaces are intuitive and provide a convenient interface, they may present some challenges for some users, especially unsophisticated or elderly operators. An inexperienced user may often have difficulties locating the correct icon or form within the GUI of application when attempting to invoke desired functionality. Accordingly, a user may be forced to underutilize the capabilities of an application, or worse, end up with an unsatisfactory result. There is an ongoing need for improved systems and methods to allow users to interact with an application that operates with a GUI interface.

SUMMARY

In accordance with one or more embodiments, various features and functionality can be provided to enable or otherwise facilitate the use of non-standard haptic commands to initiate a communication tool without interposed interaction steps.

Embodiments of the disclosure are directed to systems and methods for operating a mobile application using natural language commands. In one embodiment, the method may include obtaining a command for initiating a conversation interface. The command for initiating the conversation interface may include a haptic input effectuated on a plurality of touchscreen locations of the mobile device during an active session of a mobile application operation by the user, the mobile application comprising a graphical user interface (GUI). The method may also include displaying the conversation interface adjacent to the GUI of the mobile application. The conversation interface may be configured to receive user input including natural language user commands, and display responses generated by an assistant user.

The method may further include determining a user input area of the mobile application associated with a touchscreen location of the haptic input. In some embodiments, the haptic input may include a tap pattern, e.g. a double knock.

The method may also include obtaining information specifying user input received by the user input area of the mobile application. The method may further include determining a potential user action based on the user input received by the user input area of the mobile application. The method may also include displaying a first suggestion based on the potential user action the conversation interface. The first suggestion may include a textual prompt from a user assistant. The method may further include updating the mobile application based on the first suggestion. The updating the mobile application may include updating the GUI of the mobile application.

In some embodiments, the user input area of the mobile application may be associated with a plurality of functional operations performed by the mobile application.

In some embodiments, the plurality of functional operations performed by the mobile application may include at least one of a obtaining user data for a mortgage loan, and determining user eligibility for the mortgage loan. The potential user actions may comprise the functional operations performed by the mobile application intended by the user.

In some embodiments, the method may further include receiving a first user input in response to the first suggestion. The first user input may include a confirmation of the potential user action.

In some embodiments, the method may further include receiving a first user input in response to the first suggestion. The first user input may include a rejection of the potential user action.

In some embodiments, the method may further include displaying a second suggestion based on the first user input, and updating the mobile application based on the second suggestion.

In some embodiments, the method may further include obtaining account information associated with the mobile application operated by the user, the account information including historic user data. The historic user data may indicate commands previously received by the mobile application.

In some embodiments, the determining the potential user action may be based on the historic user data. In some embodiments, the determining the potential user action may include using a machine learning algorithm.

DETAILED DESCRIPTION

Figure 1:
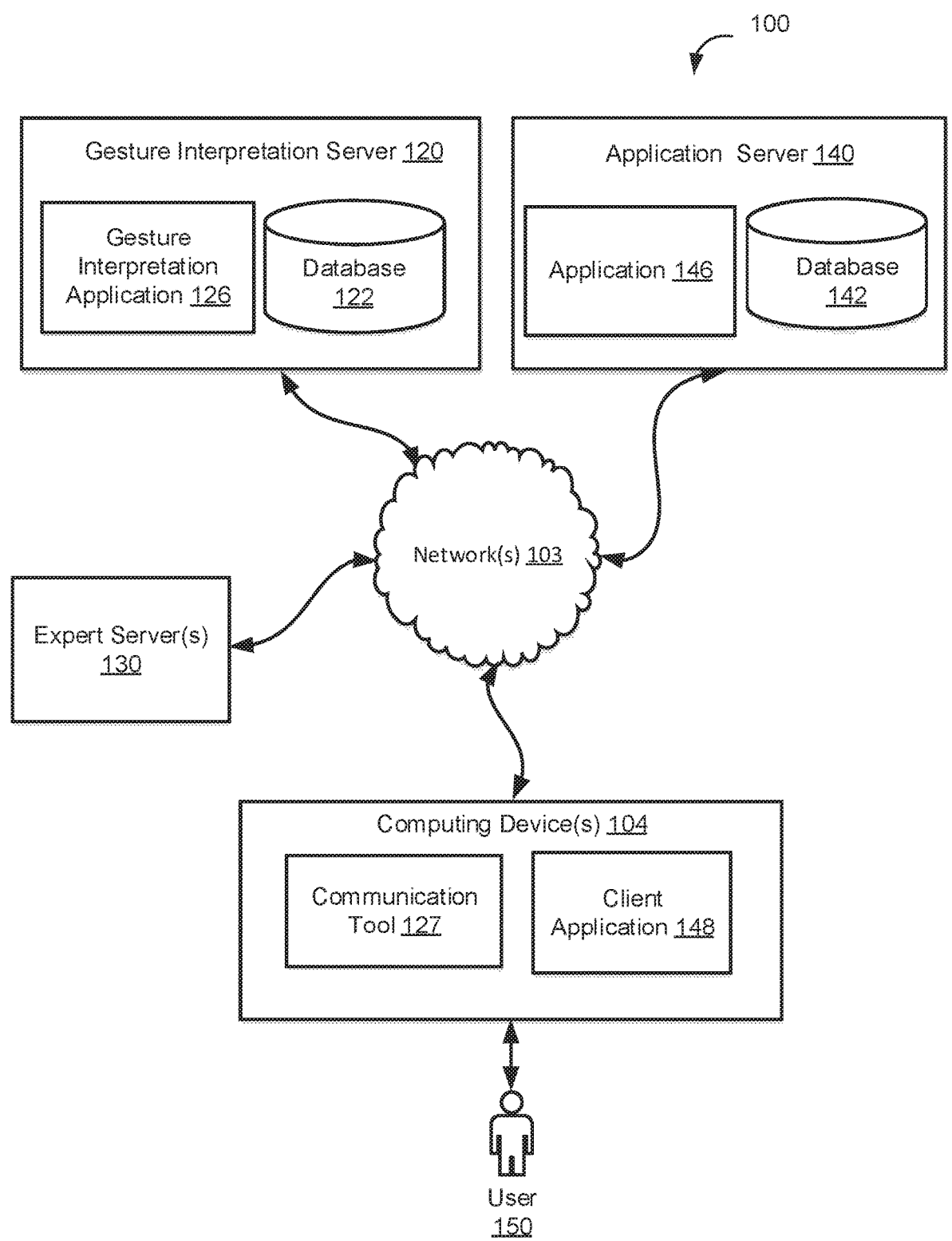
FIG. 1 illustrates example systems and a network environment, according to an implementation of the disclosure.

Described herein are systems and methods for using non-standard haptic commands and/or hand gestures to initiate a touchscreen event comprising a communication tool configured to control the operation of an application or a website. The details of some example embodiments of the systems and methods of the present disclosure are set forth in the description below. Other features, objects, and advantages of the disclosure will be apparent to one of skill in the art upon examination of the following description, drawings, examples and claims. It is intended that all such additional systems, methods, features, and advantages be included within this description, be within the scope of the present disclosure, and be protected by the accompanying claims.

As alluded to above, a touchscreen is an input device that allows users to operate a computing device by simply touching the display screen. A touchscreen consists of a display and a sensor for user input, and it can be considered a touch-sensitive surface. Accordingly, a user operates a computing device (e.g., smartphone and smartwatch) by touching the touchscreen in a particular way, allowing the user to control and/or trigger a particular computing functionality. For example, initiating an application. Additionally, different areas of the touchscreen may be associated with different areas of the application or website. By touching different areas of the touchscreen may trigger distinct functions based on the location of the touchscreen that received user input.

However, in order to trigger one such function, users have to perform certain interaction steps that often interrupt their current activities. For example, users have to locate a particular area within the touchscreen corresponding to a GUI element associated with a particular application. This often results in users exiting or otherwise ceasing operation a current application they may be using in order to locate the GUI element associated with a new application. By using a distinguishable gesture to control and/or trigger particular computing functionality without ending operation of a current application and returning to the computing device's GUI eliminates the interposed interaction steps.

Finally, users may experience challenges when interacting with a graphical user interface associated with applications or websites. In particular, users that use mobile applications do so with a particular purpose of solving a particular problem (e.g., reserve airline tickets or purchase an item). Because the most convenient way for humans to solve problems is through a conversation, users may want to be interacting with any application or website through a communication tool configured to operate such application or website. By allowing users to interact with an application or a website through natural language commands, results in a more user-friendly interaction for the users and produces a more satisfactory user experience. Furthermore, by using a distinguishable gesture (e.g., a double knock) to control and/or trigger particular computing functionality, such as initiating a communication tool without having to return to the computing device GUI, as explained above, allows users to remain active in their current application or website.

In accordance with various embodiments, a user can trigger a touchscreen event comprising initiating a communication tool through gestures. For example, a user can double knock on a screen or a housing of a communication device such as a smartphone to initiate a communication tool. In some embodiments, the communications tool may be a widget that is configured to allow users to control and/or interact with functionalities of associated applications. For example, the communication tool may include a conversation or chat interface. Because the communication tool may be integrated such as to control a number of applications, the user can interact with a particular mobile application or a website using text commands in a natural language without having to learn new skills to interact with the GUI commonly associated with a mobile application or website, as alluded to earlier.

Additionally, by using a gesture (e.g., a double knock) to initiate the communication tool, the present embodiments provide the user with a simple yet effective way to avoid any interposed interaction steps that often interrupt their current activities, i.e., requiring the user to exit the GUI of the application he or she may be currently interacting with, and thus bypassing the GUI of the computing device. For example, when using a conventional smartphone, the user would have to exit the application and initiate the communication tool from the GUI of the device (e.g., by tapping on the icon). However, by virtue of allowing the user to trigger the touchscreen event of initiating the communication tool by a gesture, eliminates the unnecessary steps of exiting the current application and initiating the communication tool, as alluded to above. Furthermore, in some embodiments, the communication tool may gather, collect, and analyze user data including a location of the touchscreen where user input was entered and the corresponding area of an application or website. By virtue of tracking user data, the communication tool may provide user with additional functionality, as described in further detail below.

Before describing the technology in detail, it is useful to describe an example environment in which the presently disclosed technology can be implemented. FIG. 1 illustrates one such example environment 100.

FIG. 1 illustrates an example environment 100 which permits users to utilize non-standard haptic commands and/or hand gestures to trigger one or more events within client computing device 104. For example, an event triggered by a non-standard haptic command may include initiating a communication tool configured to control the operation of an application or a website via natural language commands. By determining a particular area within the application or website associated with an area of a touchscreen that received the non-standard haptic command, may trigger additional events and/or functionality for controlling and operating the application or website.

Additionally, users may trigger the event via non-standard haptic commands without interrupting their current operation of an application or a website, as described herein. In some embodiments, environment 100 may include a client computing device 104, a gesture interpretation server 120, a one or more expert servers 130, a mobile application server 140, and a network 103. A user 150 may be associated with client computing device 104 as described in detail below.

In some embodiments, the various below-described components of FIG. 1 may be used to detect and process non-standard haptic commands user 150 enters by touching touchscreen 115 (illustrated in FIG. 2) of client communication device 104 to initiate one or more events within client computing device 104. For example, as alluded to above, users may control the operation of various applications or websites on their client computing device 104 using GUIs associated with those applications or websites. For example, user 150 may operate a particular mobile application (e.g., Uber, Expedia, and so on), browse a mortgage loan website, or exchange text messages via SMS (short message service), a text messaging service component of client computing device 104.

In some embodiments, client computing device 104 may include a variety of electronic computing devices, such as, for example, a smartphone, tablet, laptop, computer, wearable device, television, virtual reality device, augmented reality device, displays, connected home device, Internet of Things (IOT) device, an enhanced general packet radio service (EGPRS) mobile phone, a media player, a navigation device, a game console, a television, a remote control, or a combination of any two or more of these data processing devices, and/or other devices. In some embodiments, client computing device 104 may present content to a user and receive user input. In some embodiments, client computing device 104 may parse, classify, and otherwise process user input. For example, client computing device 104 may store user input including non-standard haptic commands for initiating client communication tool 127, as will be described in detail below.

In some embodiments, client computing device 104 may be equipped with GPS location tracking and may transmit geolocation information via a wireless link and network 103. In some embodiments, gesture interpretation server 120 and/or distributed gesture interpretation application 126 may use the geolocation information to determine a geographic location associated with user 150. In some embodiments, gesture interpretation server 120 may use signal transmitted by client computing device 104 to determine the geolocation of user 150 based on one or more of signal strength, GPS, cell tower triangulation, Wi-Fi location, or other input. In some embodiments, the geolocation associated with user 150 may be used by one or more computer program components associated with the gesture interpretation application 126 during user 150 interaction with chat interface of the client communication tool 127.

In some embodiments, client computing device 104 may include a display 115 comprising an LCD screen and a microphone 116 (illustrated in FIG. 2), among other standard components. For example, display 115 may be a touchscreen configured to allow users to operate computing device 104 by haptic or touch commands In some embodiments, a sensor within client computing device 104 may be provided, including accompanying software, firmware and/or hardware, configured to monitor and interpret whether user input includes a "double knock" gesture input.

In some embodiments, client communication device 104 may be configured to operate in one or more communication modes. For example, client communication device 104 may operate in a data communication mode, a voice communication mode, and/or other similar communication modes.

For example, client communication device 104, configured to operate in a data communication mode, may receive a signal (e.g., a text message or media content download) and provide it as an input to be further processed to generate an output for displaying by via within cl or to an auxiliary I/O device. User 150 may also compose data items, such as e-mail messages, using a keypad and/or some other auxiliary I/O device, such as a touchpad, a rocker switch, a trackball or some other input device. The composed data items may then be transmitted over communication network 103.

Conversely, in a voice communication mode, overall operation of client communication device 104 is substantially similar to the data communication mode, except that received signals are output to a speaker 117, and signals for transmission are generated by microphone 116. In some embodiments, a voice message recording system or module may also be implemented on client communication device 104. In some embodiments, display 115 may also be utilized in voice communication mode, for example, to display the identity of a calling party, the duration of a voice call, or other voice call-related information.

As alluded to earlier, some users may want to control the operation of an application or a website through a communication tool adapted to accept natural language commands rather than through a GUI associated with those applications or websites. Additionally, because it is preferred to initiate the communication tool without having to return to the computing device GUI, as explained above, by virtue of using a distinguishable gesture (e.g., a double knock) to control and/or trigger particular computing functionality, such as initiation a communication tool allows users to remain active in their current application or website.

In some embodiments, the commands entered by user 150 via display 115 of client computing device 104 may be recognized by gesture interpretation application 126 as a series of haptic inputs received on client computing device 104. For example, the commands entered by user 150 may include a series of knocking gestures effectuated upon touchscreen 115. In some embodiments, gesture interpretation application 126 may have access to sensor data of the touchscreen. That is, gesture interpretation application 126 may receive touchscreen events as input and trigger gesture events as output based on the detected gestures as described in further detail below.

In some embodiments, gesture interpretation server 120 may include one or more distributed applications implemented on client computing device 104 (e.g., gesture interpretation application 126) as client applications (e.g., communication tool 127). As alluded to above, distributed applications and client applications of gesture interpretation server 120 may have access to sensor data included in client computing device 104. In some embodiments, gesture interpretation application 126 may have a client allocation implemented within client computing device 104. For example, communicating tool 127 may be implemented by a distributed gesture interpretation 126 application. In other embodiments, a client application may be implemented by a distributed gesture interpretation 126 application within gesture interpretation server 120 such that it is not the same as communication tool 127 (i.e., communication tool 127 may be implemented by another distributed application). In yet other embodiments, client communication tool 127 may be provided by a distributed application within another server of system 100.

As alluded to above, one such event triggered by a non-standard haptic command may be an initiation of a client communication tool 127 within client computing device 104. In some embodiments, client communication tool 127 may comprise a chat interface configured to control and/or operate an application or website 148 running on client computing device 104 (client application 148 may be provided by a distributed application 146 running on application server 140).

In some embodiments, client communication tool 127 may be initiated after client application 148 has been initiated. For example, the various components of FIG. 1 may be configured to initiate client communication tool 127 upon receiving user input associated with initiating client communication tool 127 as will be described in detail below. For example, user 150 may first initiate client application 148 via one or more user inputs associated with initiating client application 148. Next, user 150 may trigger a touchscreen event by a non-standard haptic command configured to initiate client communication tool 127 to run alongside or next to client application 148 on client computing device 104. For example, user 150 may provide user input (e.g., knocking or tapping) within a GUI associated with client computing device 104.

In some embodiments and as will be described in detail in FIG. 2, gesture interpretation server 120 may include a processor, a memory, and network communication capabilities. In some embodiments, gesture interpretation server 120 may be a hardware server. In some implementation, gesture interpretation server 120 may be provided in a virtualized environment, e.g., gesture interpretation server 120 may be a virtual machine that is executed on a hardware server that may include one or more other virtual machines. Gesture interpretation server 120 may be communicatively coupled to a network 103. In some embodiments, gesture interpretation server 120 may transmit and receive information to and from one or more of client computing devices 104, mobile application server 140, one or more expert servers 130, and/or other servers via network 103.

In some embodiments, gesture interpretation server 120 may include gesture interpretation application 126, as alluded to above. Gesture interpretation application 126 may be a distributed application implemented on one or more client computing devices 104 as client communication tool 127, as described herein. In some embodiments, distributed gesture interpretation application 126 may be implemented using a combination of hardware and software. In some embodiments, gesture interpretation application 126 may be a server application, a server module of a client-server application, or a distributed application (e.g., with a corresponding client communication tool 127 running on one or more client computing devices 104).

In some embodiments, application 146 may communicate and interface with a framework implemented by distributed gesture interpretation application 126 using an application program interface (API) that provides a set of predefined protocols and other tools to enable the communication. For example, the API can be used to communicate particular data from gesture interpretation application 126 used to connect to and synchronize with application 148 that user 150 is operating via the client communication tool 127. In some embodiments, a standard API can be used between client communication tool 127 and application 146, allowing user 150 to control a large variety of applications provided by many different providers.

Figure 2:
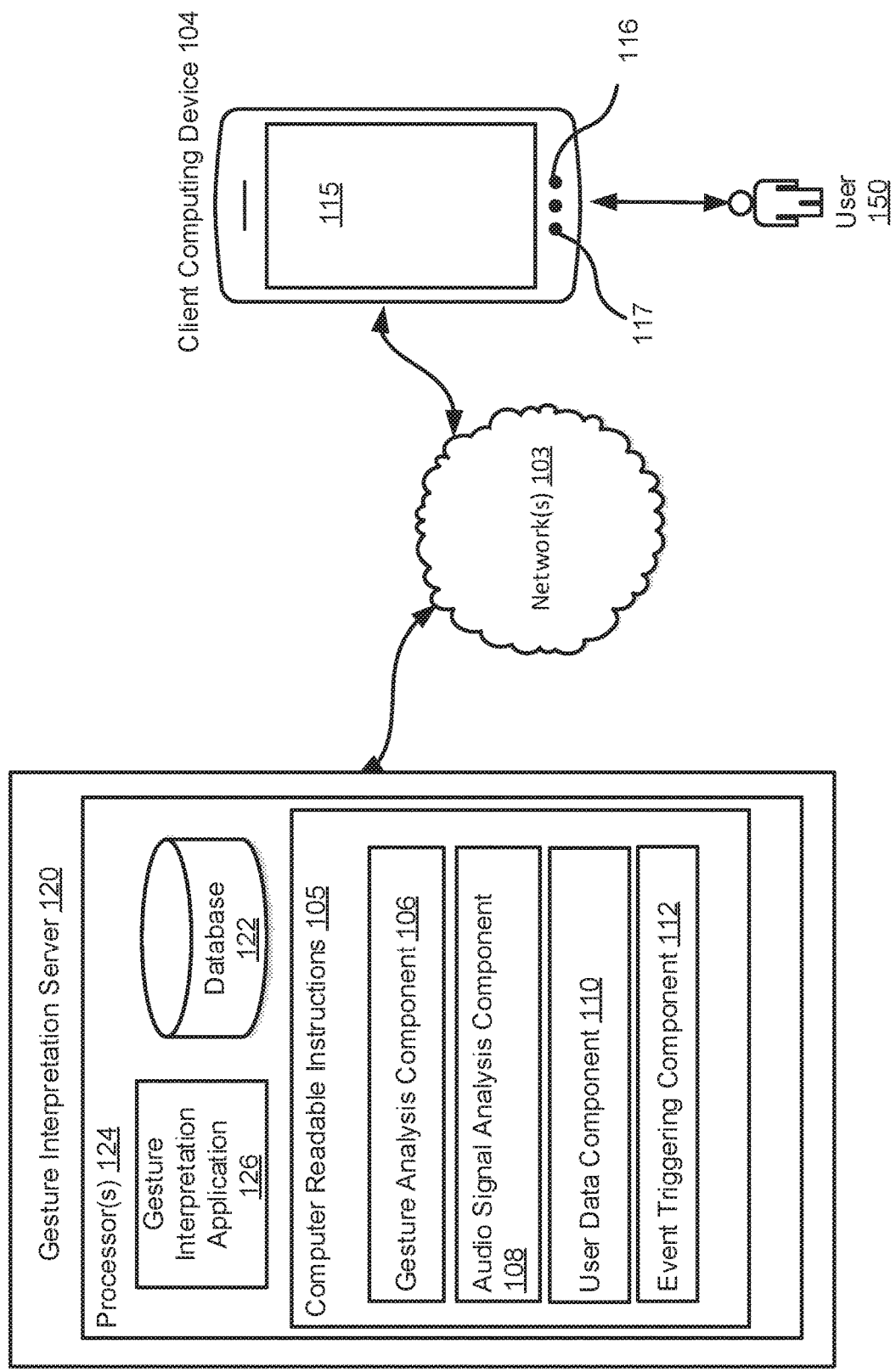
FIG. 2 illustrates an example gesture interpretation server of the example system of FIG. 1, according to an implementation of the disclosure.

FIG. 2 illustrates an example gesture interpretation server 120 configured in accordance with one embodiment. In some embodiments, as alluded to above, gesture interpretation server 120 may include a distributed gesture interpretation application 126 configured to provide functionality to enable recognition of non-standard haptic commands and/or hand gestures entered by user 150 via display 115 of client computing device 104 to trigger one or more events within client computing device 104.

In some embodiments, gesture interpretation server 120 may also include a database 122. For example, database 122 may store haptic command information, user data associated with user 150, prior user interactions or operations with an application or website, machine learning data, and/or other information.

In some embodiments, distributed gesture interpretation application 126 may be operable by one or more processor (s) 124 configured to execute one or more computer readable instructions 105 comprising one or more computer program components. In some embodiments, the computer program components ma include one or more of a gesture analysis component 106, an audio signal analysis component 108, a user data component 110, an event triggering component 112, and/or other such components.

In some embodiments, as alluded to above, user 150 may access gesture interpretation server 120 via client computing device 104. In some embodiments, gesture analysis component 106 may be configured to detect one or more user inputs or interactions from one of the client computing devices 104 and interpret the detected input or interaction as a command for outputting a triggering event. For example, a triggering event may include initiating client communication tool 127, as described in further detail below. In other embodiments, user 150 may initiate communication tool 127 via one or more haptic commands, voice commands, and/or a combination of haptic and voice commands. For example, the haptic commands may include user 150 knocking, tapping, and/or scratching on client computing device 104.

In some embodiments, different haptic commands may be associated with different triggering events. For example, a double knocking gesture may be used to trigger an event comprising initiation of client communication tool 127. In other examples, a triple knocking gesture may be used to trigger an event comprising initiation of client communication tool configured to interact with particular applications only.

In some embodiments, one or more monitoring circuits which utilize one or more sensors may be used to obtain a signal associated with the haptic commands. For example, a monitoring circuit motion sensor may utilize a motion sensor to monitor for double knocking signal made on client computing device 104. In some embodiments, an accelerometer may be used. For example, the accelerometer may be a low-g MEMS (micro-electromechanical system), a capacitive, piezoelectric, piezoresistive, or a gas-based accelerometer. Accelerometers sense and convert an acceleration detected from a motion (e.g. tilt, inertial, or vibration) or gravity into an electrical signal (producing a corresponding change in output) and are available in one, two or three axis configurations. Accelerometers may produce digital or analog output signals.

In some embodiments, a pattern for triggering an event (e.g., initiating communication tool 127) may be defined and calibrated as a series of signals expected to be received by a sensor in client computing device 104. In some embodiments, calibrations and adjustments can be made for different time parameters (e.g. slowly entered knocks or quickly entered knocks) and magnitude qualities (e.g. loud or soft knocks), such that if the pattern of the knock is repeated, but either at a slower or faster than speed of the expected knock pattern, adjustments can be made to compare the pattern apart from its overall duration characteristics. Additional calibrations for one or more of the directions may be made for the location of the double knocking input (e.g. whether it is on the top, back or sides of client computing device 104).

In some embodiments, a gesture may be detected on any part of touchscreen display 115. In some embodiments, the gesture detected within a particular part of display 115 may trigger a different output event than if the gesture was detected within a different part of display 115. For example, sensors may be provided at different locations inside the client computing device 104. The triggering effect may vary depending on the location of the sensors For example, a piezoelectric sensor may be may be integrated with different areas of the touchscreen 115.

In some embodiments, the haptic commands detected by one or more user inputs or interactions from the client computing device 104 and interpreted as a command for outputting a triggering event may be selected by the gesture interpretation application 126 running on the gesture interpretation server 120. For example, the gesture interpretation application 126 may include a double knocking command used to initiate the client communication tool 127. In other examples, In some embodiments, user 150 may modify the haptic command selection to another command available to the user. For example, user 150 may indicate that instead of double knocking, the user wants to initiate client communication tool 127 by scratching client computing device 104. In some embodiments, user 150 may create a new haptic or voice command by recording the user input associated with the command.

In some embodiments, audio signal processing component 108 may be configured to capture audio signal produced from the haptic input (such as knocking, tapping, or scratching) or voice input (such as a command spoken by a user) by the device microphone. For example, user 150 may knock twice onto display 115 of computing device resulting in an audio signal. In some embodiments, the captured audio signal may be obtained by audio signal processing component 108 to determine whether the audio signal corresponds to the audio signal used to initiate client communication tool 127. For example, the audio signal may be obtained from microphone 116 of client computing device 104. In some embodiments, audio signal processing component 108 may be configured to manipulate the audio signal obtained by transmitting the audio signal to the gesture interpretation server 120. In some embodiments, audio signal processing component 108 may be configured to process audio signal. For example, audio signal processing component 108 may be configured perform at least one of a noise removal, windowing and a spectrum analysis during processing of the audio signal. In some embodiments, audio signal processing component 108 may be configured to determine if the audio signal received from the microphone of client computing device 104 is a valid haptic input or a voice command by matching the processed audio signal to a valid audio signal. In some embodiments, the valid audio signal may be obtained from database 122.

In some embodiments, audio signal processing component 108 may be configured to process user input obtained by audio signal processing component 108. For example, audio signal processing component 108 may process audio input entered via a microphone 116 of client computing device 104. In some embodiments, audio signal processing component 108 may process user input comprising an audio file by performing one or more operations including, for example, voice recognition, conversion of voice messages into textual format, and/or other such operations.

In some embodiments, audio signal processing component 108 may convert the user input comprising an audio file into a text file by converting the audio file into the text file according to a voice recognition process that may be implemented by gesture interpretation application 126. For example, after obtaining the user audio file, audio signal processing component 108 may convert the audio file to the text file according to the voice recognition process algorithm implemented by gesture interpretation application 126. In some embodiments, chat audio signal processing component 108 may perform voice recognition by means of a pattern matching method and/or other similar method. For example, when using a pattern matching method to perform voice recognition, a training stage and a recognition stage may be used.

In some embodiments, upon determining that the haptic or voice command is valid, user data component 110 may be configured to obtain information associated with user and user operations prior to receiving the haptic command on client computing device 104. In some embodiments, user data component 110 may be configured to determine one or more user intended actions user 150 was attempting to achieve when interacting with the application or website. For example, user data component 110 may determine that user 150 is viewing a website the provides information and services related to mortgage products. User data component 110 may obtain information associated with user operations indicating that user 150 is looking at FHA loans. In some embodiments, user information may include user profile data, user demographic information, user status, and so on. In some embodiments, user data component 110 may be configured to obtain information associated with user profile of an application or website. For example, user information may include one or more applications or websites user 150 was operating before entering the non-standard haptic command on client computing device 104. By virtue of obtaining user information and determining user intended actions (e.g., user intends to obtain an FHA loan) by user data component 110, allows gesture interpretation application 126 to generate a response or an action with the application or website that is most likely to result in a user satisfactory experience as described further below. For example, a communication tool initiated between an expert in FHA loans and user 150 may allow user 150 to obtain necessary information.

In some embodiments, user data component 110 may be configured to obtain prior user operations, actions, or interactions with an application or website. For example, prior user operations may include information related to previous products or actions user obtained from interacting with the application or website.

In some embodiments, user data component 110, may be configured to use machine learning, i.e., a machine learning model that utilizes machine learning to determine user intended actions. For example, in a training stage the expert server (or other component) can be trained using training data (e.g., message training data) of actions in an application or website context, and then at an inference stage can determine suggested items to intended actions or other data it receives. For example, the machine learning model can be trained using synthetic data, e.g., data that is automatically generated by a computer, with no use of user information. In some embodiments, the machine learning model can be trained based on sample data, e.g., sample message data, for which permissions to utilize user data for training have been obtained expressly from users providing the message data. For example, sample data may include interactions between other users within the application or website. Based on the sample data, the model can predict which actions and/or results user 150 would want to achieve, which may then be provided as intended user actions.

In some embodiments, user data component 110 may be configured to use one or more of a deep learning model, a logistic regression model, a Long Short Term Memory (LSTM) network, supervised or unsupervised model, etc. In some embodiments, response component 112 may utilize a trained machine learning classification model. For example, the machine learning may include, decision trees and forests, hidden Markov models, statistical models, cache language model, and/or other models. In some embodiments, the machine learning may be unsupervised, semi-supervised, and/or incorporate deep learning techniques.

In some embodiments, user data component 110 may be configured to obtain information associated with user 150 and user operations based on the area of a touchscreen used by the user command (e.g., the double knock). Because different areas of the touchscreen may be associated with different areas of the application or website, by obtaining the touchscreen location information may allow user data component 110 to determine which part of the application or website user 150 was interacting with. For example, as alluded to above, user may be viewing a mortgage lender website. Specifically, user may be attempting to obtain a mortgage rate for an FHA loan by selecting the FHA product from a dropdown list located in a top part of the mortgage website. Further, user 150 may double knock in touchscreen 115 in the area of the screen corresponding to the mortgage loan drop down menu (i.e., top part of the screen). By virtue of determining the location of user entered non-standard haptic command, user data component 110 may determine that user 150 intended action is obtain information on one or more mortgage loans.

Figure 3B:
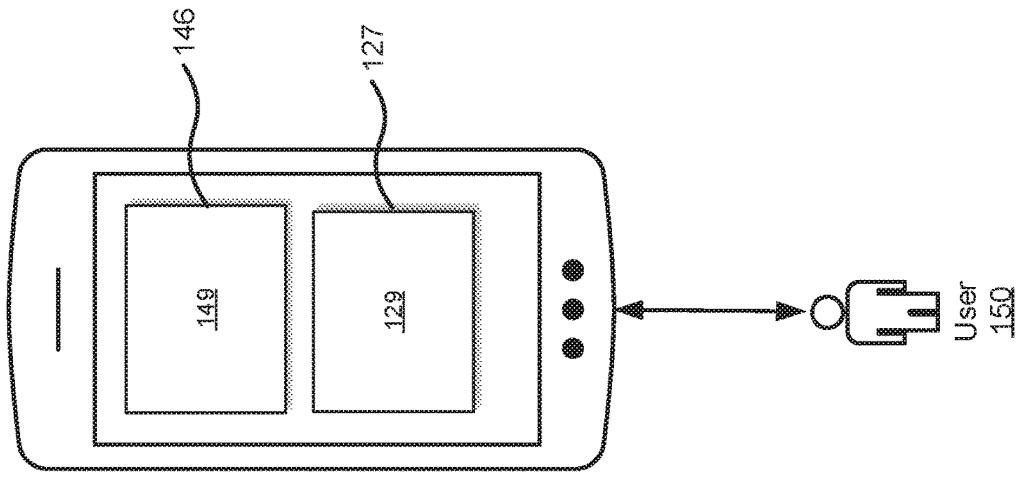
FIGS. 3A-3B illustrate an example process for initiating a communication tool, according to an implementation of the disclosure.
Figure 3A:
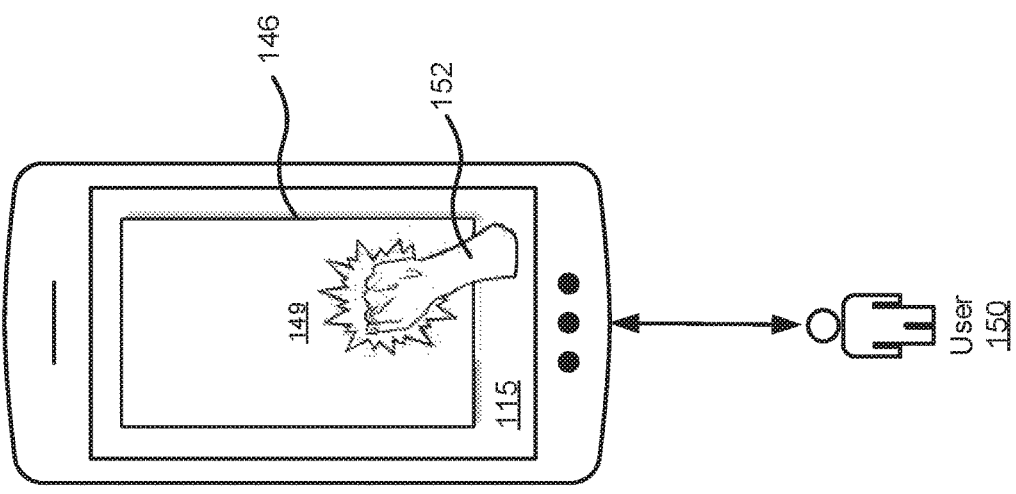

In some embodiments, upon receiving a determination of intended user actions by user data component 110, event triggering component 112 may be configured to initiate client communication tool 127 on client computing device 104. For example, as illustrated in FIG. 3A, user 150 may enter an event triggering command 152 comprising a double knock onto a touchscreen 115 of client computing device 104 when operating an mobile application 149 via a GUI 149 presented on client computing device 104. Upon receiving a determination that event triggering command 152 is a valid event triggering command by gesture analysis component 106 and audio signal processing component 108, and upon receiving a determination of intended user actions by user data component 110, event triggering component 112 may initiate client communication tool 127 on client computing device 104, as illustrated in FIG. 3B. Client communication tool 127 may comprise a chat interface 129 and may be configured to provide client functionality to enable user 150 to operate mobile application 146 provided on client computing device 104 via natural language commands entered via chat interface 129 rather than a GUI 149 associated with mobile application 146.

In some embodiments, client communication tool 127 initiated by event triggering component 112 may assist user 150 with operating an application or website user was interacting with prior to triggering the event via non-standard haptic command (e.g., double knocking). For example, chat interface 129 of client communication tool 127 may allow user 150 to operate mobile application 146 by exchanging messages with one or more chat assistants (e.g., human users or automated software agents or bots). For example, these chat assistants may help user 150 to operate mobile application 146 by eliciting commands from user 150 intended for mobile application 146, generating responses, and effectuating mobile application 146 to generate results associated with the commands received form user 150. By virtue of exchanging messages with an assistant, user 150 can operate mobile application 146 without having to learn an interface associated with client application 148 resulting in a more efficient and streamlined user experience. In some embodiments, event triggering component 112 may be configured to prompt user 150 for additional information based on the determination related to user intended actions made by user data component 110. For example, upon determining that the intended user action includes obtaining an FHA loan, chat assistant may prompt user 150 to provide additional information such as preferred loan rate, loan term, property information, and so on.

In some embodiments, the chat assistant may be selected based on the intended user actions determined by user data component 110. For example, if event triggering command 152 was obtained when user 150 was viewing mortgage lender website, the chat assistant selected may be a mortgage experts.

In some embodiments, event triggering component 112 may be configured to effectuate actions within mobile interface 149 of client application 148 based on user commands entered via chat interface 129. For example, event triggering component 112 may effectuate presentation of items relevant and/or responsive to user's request within GUI 149 of mobile application 146 (e.g., available flights at a particular date, tickets at a particular price, etc.) In some embodiments, user commands may include one or more actions executed by mobile application 146. For example, the user commands may include booking a flight, making a dinner reservation, requesting to be picked up by a ride-share driver, purchasing a pair of shoes, and so on. In some embodiments, event triggering component 112 may execute one or more action within mobile interface 149 based on user commands. For example, upon receiving a user command to book a ticket, mobile interface 149 may display the flight reservation information associated with the order included in the user command.

In some embodiments, event triggering component 112 may be configured to effectuate actions within a native massaging application associated with client computing device 104. For example, user 150 may activate communication tool 127 via double knock command 149 upon receiving an SMS message in a native messaging application. Once initiated by event triggering component 112, client communication tool 127 may present user 150 with one or more suggestions of responding to the SMS message including sender's contact information allowing user 150 to call rather than correspond via messages with the sender.

Figure 4:
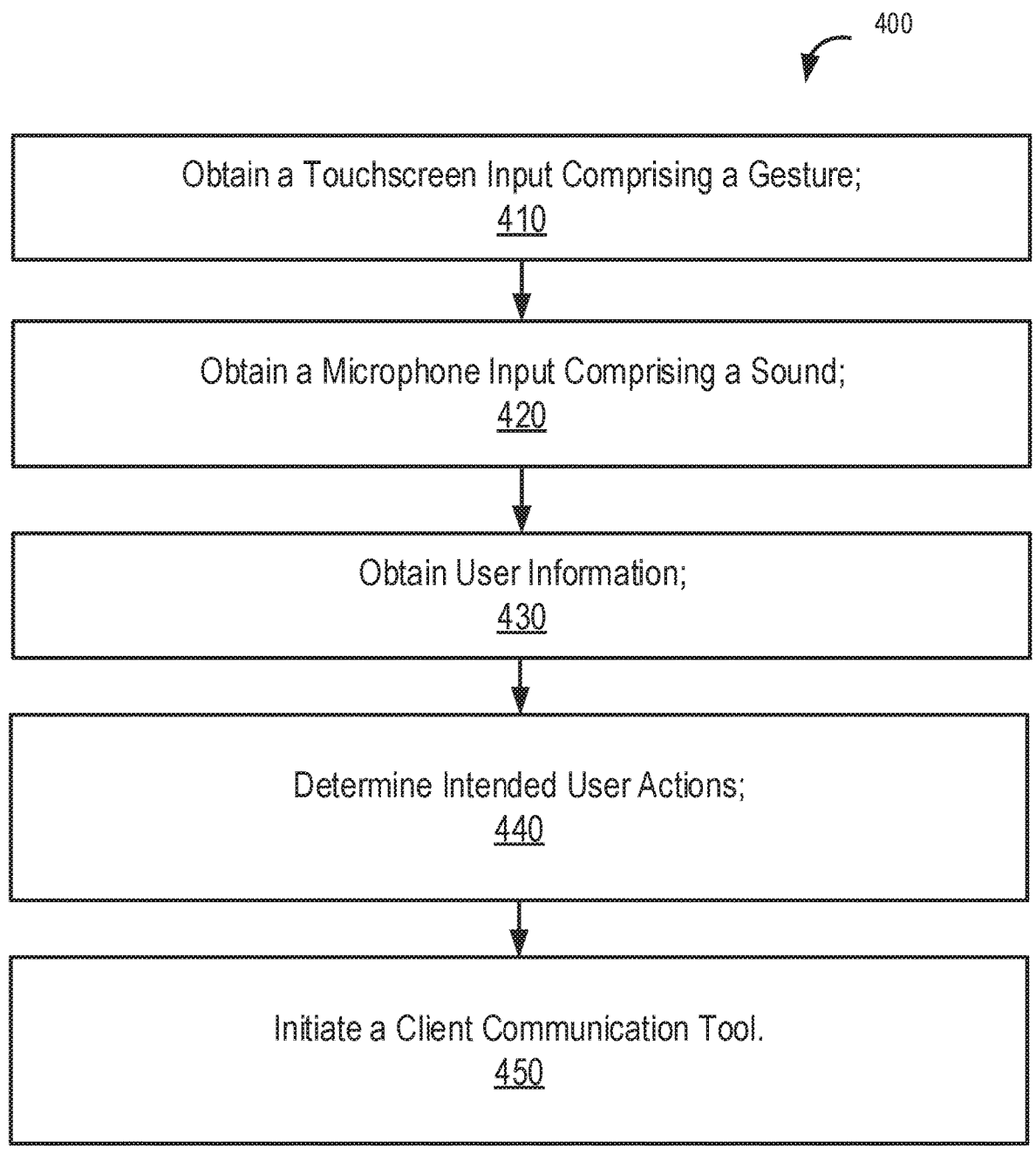
FIG. 4 illustrates an example process for triggering a touchscreen event using non-standard haptic commands, according to an implementation of the disclosure.

FIG. 4 illustrates a flow diagram describing a method for using non-standard haptic commands to initiate client communication tool on a client computing device, in accordance with one embodiment. In some embodiments, method 400 can be implemented, for example, on a server system, e.g., gesture interpretation server 120, as illustrated in FIG. 1. At operation 410, gesture analysis component 106 determines whether received user non-standard haptic input command (e.g., a double knock) for initiating the client communication tool is valid. At operation 420, audio signal processing component 108 determines whether received user audio input command for initiating the client communication tool is valid. For example, as alluded to earlier, audio signal processing component 108 may process an audio signal obtained from a microphone of client computing device and compare it a valid audio signal.

At operation 430, upon determining that the received haptic and audio user input for initiating the client communication tool is valid, user data component 110 obtains information associated with user and user operations prior to receiving the haptic command on client computing device 104. At operation 440, upon determining that the received user input for initiating the client communication tool is valid, user data component 110 determines one or more user intended action user was attempting to achieve when interacting with the application or website. At operation 450, upon receiving a determination of intended user actions by user data component 110, event triggering component 112 may be configured to initiate a client communication tool on client computing device 104.

Figure 5:
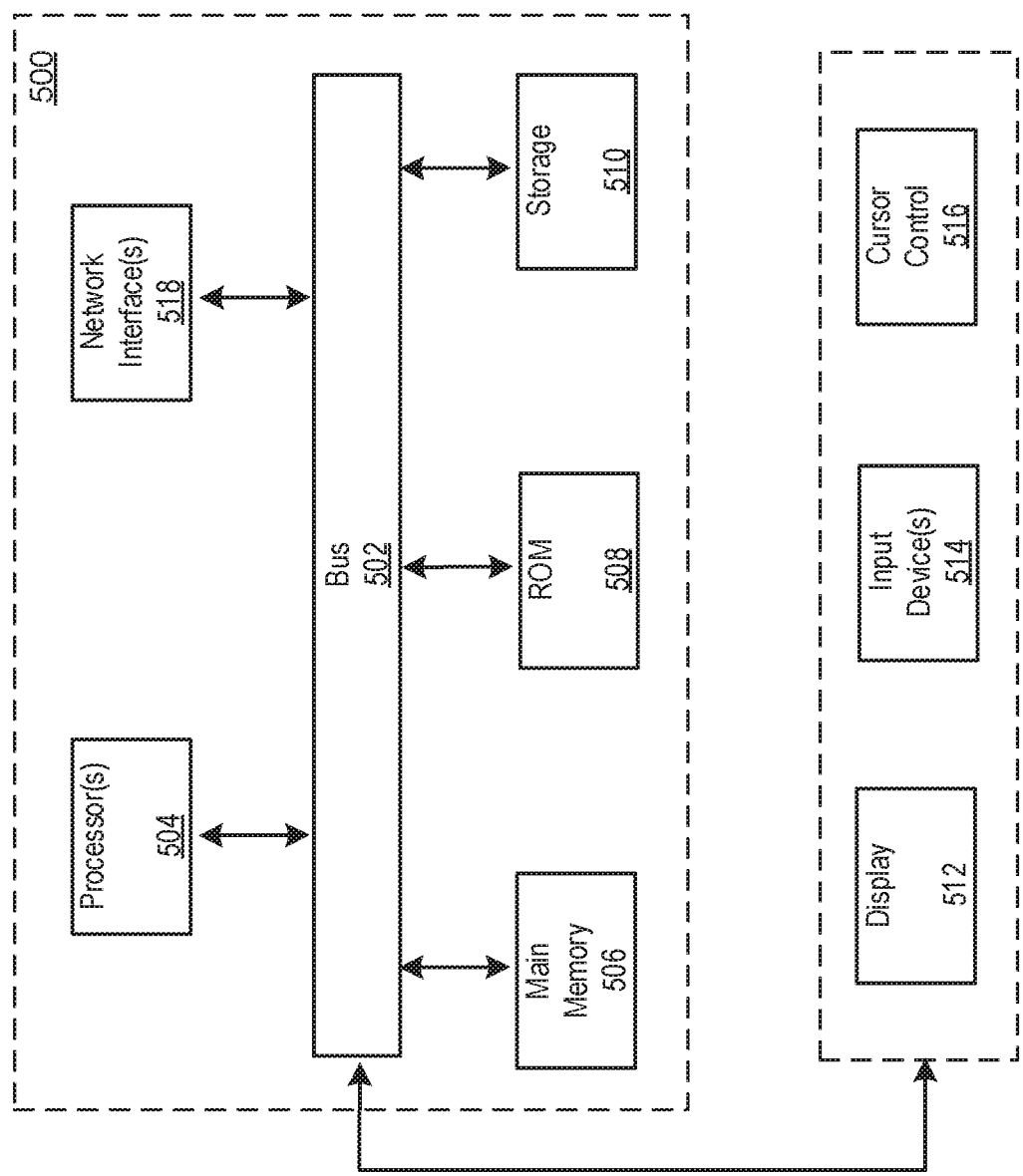
FIG. 5 illustrates an example computing system that may be used in implementing various features of embodiments of the disclosed technology.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 505, such as a random access memory (RAM), cache and/or other dynamic storage devices, coupled to bus 502 for storing information and instructions to be executed by processor 504. Main memory 505 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

In general, the word "component," "system," "database," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 505. Such instructions may be read into main memory 505 from another storage medium, such as storage device 510. Execution of the sequences of instructions contained in main memory 505 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 505. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent.

Although described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the present application, whether or not such embodiments are described and whether or not such features are presented as being a part of a described embodiment.

Thus, the breadth and scope of the present application should not be limited by any of the above-described exemplary embodiments.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method for operating a mobile application using natural language commands, the method comprising:
   during an active communication session between a mobile application and a user operating a mobile device, obtaining a command for initiating a conversation interface, wherein the command for initiating the conversation interface comprises a haptic input effectuated on a plurality of touchscreen locations of the mobile device, and wherein the mobile application comprises a graphical user interface (GUI);
   displaying the conversation interface adjacent to the GUI of the mobile application, wherein the conversation interface is configured to receive user input comprising natural language user commands for eliciting a plurality of functional operations performed by the mobile application, and to display responses generated by an assistant user in response to an output generated by the mobile application based on the user commands;
   determining a user input area of the mobile application associated with a touchscreen location of the haptic input;
   obtaining information specifying user input received by the user input area of the mobile application;
   determining a potential user action based on the user input received by the user input area of the mobile application;
   displaying a first suggestion in the conversation interface based on the potential user action, wherein the first suggestion comprises a textual prompt from a user assistant; and
   updating the mobile application based on the first suggestion;
   wherein the updating the mobile application comprises updating the GUI of the mobile application; and
   wherein the user input area of the mobile application is associated with the plurality of functional operations performed by the mobile application.

2. The method of claim 1, wherein the plurality of functional operations performed by the mobile application comprises at least one of obtaining user data for a mortgage loan, and determining user eligibility for the mortgage loan.

3. The method of claim 1, further comprising receiving a first user input in response to the first suggestion, wherein the first user input comprises a confirmation of the potential user action.

4. The method of claim 1, further comprising receiving a first user input in response to the first suggestion, wherein the first user input comprises a rejection of the potential user action.

5. The method of claim 4, further comprising displaying a second suggestion based on the first user input, and updating the mobile application based on the second suggestion.

6. The method of claim 1, further comprising obtaining account information associated with the mobile application operated by the user, the account information comprising historic user data, wherein the historic user data indicates commands previously received by the mobile application.

7. The method of claim 6, wherein determining the potential user action is based on the historic user data.

8. The method of claim 1, wherein determining the potential user action comprises using a machine learning algorithm.

9. The method of claim 1, wherein the haptic input comprises a tap pattern.

10. A system for operating a mobile application using natural language commands, the system comprising:
    one or more physical processors configured by machine-readable instructions to:
      obtain a command for initiating a conversation interface, wherein the command for initiating the conversation interface comprises a haptic input effectuated on a plurality of touchscreen locations of the mobile device, wherein the mobile application comprises a graphical user interface (GUI), and wherein the command is obtained during an active communication session between a mobile application and a user;
      display the conversation interface adjacent to the GUI of the mobile application, wherein the conversation interface is configured to receive user input comprising natural language user commands for eliciting a plurality of functional operations performed by the mobile application, and display responses generated by an assistant user in response to an output generated by the mobile application based on the user commands;
      determine a user input area of the mobile application associated with a touchscreen location of the haptic input;
      obtain information specifying user input received by the user input area of the mobile application;
      determine a potential user action based the user input received by the user input area of the mobile application;
      display, in the conversation interface, a first suggestion based on the potential user action, wherein the first suggestion comprises a textual prompt from a user assistant; and
      update the mobile application based on the first suggestion;
      wherein updating the mobile application comprises updating the GUI of the mobile application; and
      wherein the user input area of the mobile application is associated with the plurality of functional operations performed by the mobile application.

11. The system of claim 10, wherein the plurality of functional operations performed by the mobile application comprises at least one of obtaining user data for a mortgage loan, and determining user eligibility for the mortgage loan.

12. The system of claim 10, wherein the one or more physical processors are further configured to receive a first user input in response to the first suggestion, wherein the first user input comprises a confirmation of the potential user action.

13. The system of claim 10, wherein the one or more physical processors are further configured to receive a first user input in response to the first suggestion, wherein the first user input comprises a rejection of the potential user action.

14. The system of claim 13, wherein the one or more physical processors are further configured to display a second suggestion based on the first user input, and update the mobile application based on the second suggestion.

15. The system of claim 10, wherein the one or more physical processors are further configured to obtain account information associated with the mobile application operated by the user, the account information comprising historic user data, wherein the historic user data indicates commands previously received by the mobile application.

16. The system of claim 15, wherein the potential user action is determined based on the historic user data.

17. The system of claim 10, wherein the potential user action is determined using a machine learning algorithm.

18. The system of claim 10, wherein the haptic input comprises a tap pattern.

\* \* \* \* \*